Feb. 17, 1970 M. W. REED 3,496,317
SAFETY BUMPER FOR SELF-PROPELLED VEHICLE
Filed Oct. 18, 1967 2 Sheets-Sheet 1
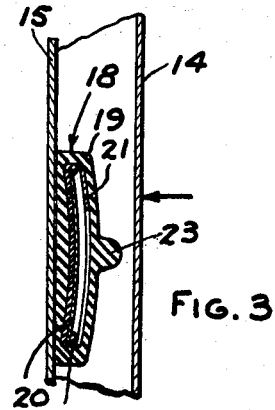
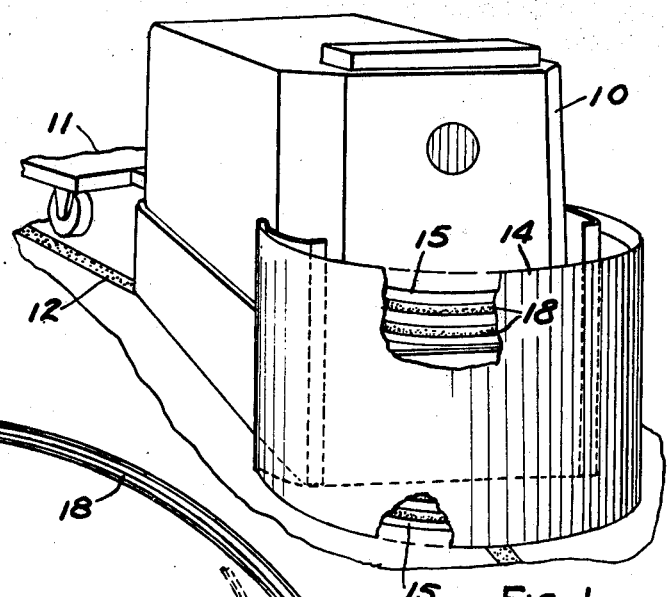
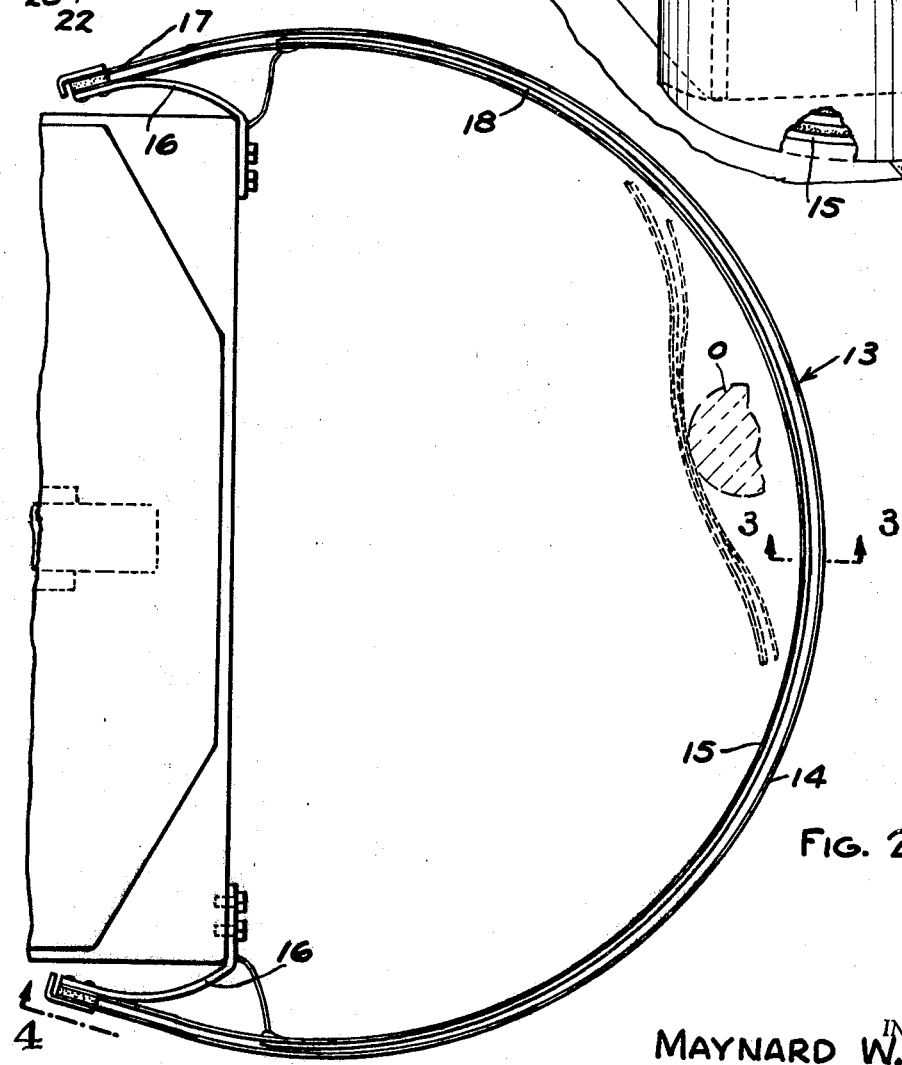
INVENTOR.
MAYNARD W. REED
BY
ATTORNEYS

INVENTOR.
MAYNARD W. REED
BY
ATTORNEYS

United States Patent Office 3,496,317
Patented Feb. 17, 1970

3,496,317
SAFETY BUMPER FOR SELF-PROPELLED VEHICLE
Maynard W. Reed, Mount Clemens, Mich., assignor, by mesne assignments, to American Chain & Cable Company, Inc., New York, N.Y., a corporation of New York
Filed Oct. 18, 1967, Ser. No. 676,319
Int. Cl. H01h 35/14
U.S. Cl. 200—52
11 Claims

ABSTRACT OF THE DISCLOSURE

The vehicle disclosed herein is of the type adapted to follow a path defined by a wire or the like extending along the floor. The safety bumper comprises a pair of flexible sheet members supported at the front of the vehicle in horizontally spaced relation so that when an obstacle is encountered, one sheet member is flexed into engagement with the other to absorb some of the energy. In accordance with the device, a continuous strip switch is provided on one of the sheet members so that when one member is flexed into engagement with the other, the switch is closed and a circuit is completed to produce a signal for either stopping the vehicle or actuating a warning device.

BACKGROUND OF THE INVENTION

In self-propelled unmanned vehicle systems wherein the vehicles follow, for example, a wire embedded in the ground, it is essential to provide for stoppage of the vehicle or at least a warning signal when the vehicle encounters an obstacle.

Accordingly, it is an object of the invention to provide a safety bumper construction wherein a signal is quickly produced. Moreover, it is a further object of the invention to provide such a construction wherein the electrical circuitry is completely enclosed and insulated so that there is no danger of shock or short circuiting due to the presence of moisture and the like.

SUMMARY

The vehicle disclosed herein is of the type adapted to follow a path defined by a wire or the like extending along the floor. The safety bumper comprises a pair of flexible sheet members supported at the front of the vehicle in horizontally spaced relation so that when an obstacle is encountered, one sheet member is flexed into engagement with the other to absorb some of the energy. In accordance with the invention, a continuous strip switch is provided on one of the sheet members so that when one member is flexed into engagement with the other, the switch is closed and a circuit is completed to produce a signal for either stopping the vehicle or actuating a warning device.

DESCRIPTION OF THE DRAWINGS

FIG. 1 is a part sectional perspective view of a vehicle embodying the invention.
FIG. 2 is a fragmentary plan view of the same.
FIG. 3 is a fragmentary sectional view on an enlarged scale taken along the line 3—3 in FIG. 2.

DESCRIPTION

Figure 4:
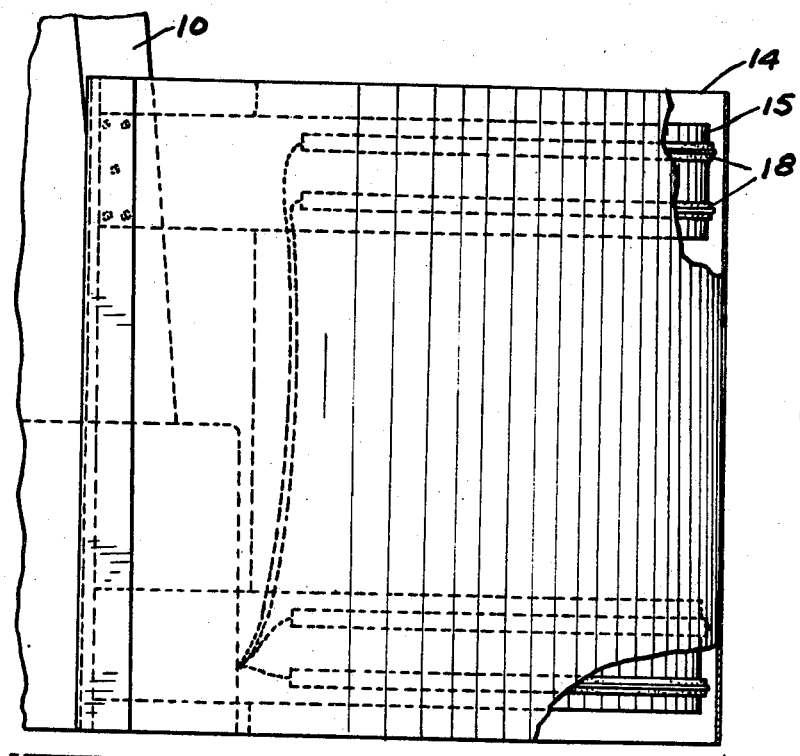
FIG. 4 is a part sectional side elevational view.

Referring to FIG. 1, the invention is shown as applied to a vehicle 10 which is of the type that is adapted to pull trailers 11 along the floor of a warehouse or the like. The vehicle 10 incorporates sensing coils (not shown) which follow a wire embedded in a slot 12 in the floor. The vehicle may further include appropriate guidance systems for guiding the vehicle along selected paths.

The vehicle includes a bumper 13 comprising spaced flexible tempered stainless steel sheet members 14, 15 that are supported by brackets 16 and insulating material 17 holding the sheet members in horizontally spaced relation with the sheet members extending generally vertically. When viewed from above as shown in FIG. 2 the sheet members define an arc of over 180°.

A plurality of continuous strip switches 18 are adhered to the outer surface of the inner sheet member 15. The continuous switch members are of conventional construction as shown in FIG. 3 and comprise a body 19 of insulating material, such as rubber, in which a continuous contact strip 20 is embedded. A second contact strip 21 is supported within body 19 in spaced relation to the first contact member 20 by an insulating member 22. The second contact member 21 may comprise a sinuous wire. Leads are connected to each of the contact members 20, 21.

When an obstacle O engages the outer sheet member 14, it deflects the outer sheet member 14 into contact with the inner sheet member 15 and, in addition, compresses the continuous strip switch 18 causing the contact member 20, 21 to come into contact to complete a circuit to an appropriate device for either stopping the vehicle or producing a warning signal. As shown in FIG. 3, the body 19 of the continuous switch 18 preferably includes a bead 23 that facilitates engagement of the outer sheet member 14 therewith.

Figure 5:
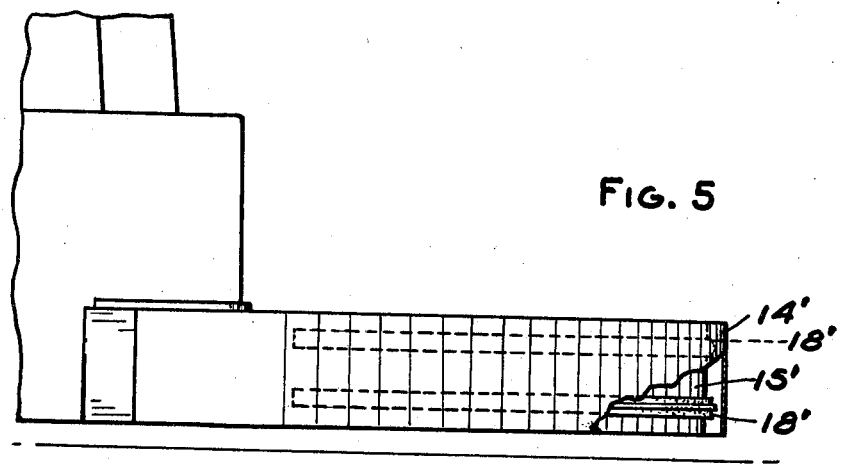
FIG. 5 is a part sectional side elevational view of a modified form of the invention.

As shown in FIG. 4, the continuous switches 18 are preferably provided in vertically disposed pairs adjacent the upper and lower ends of the sheet members 14, 15. In the case of smaller vehicles such as shown in FIG. 5, the vertical extent of the sheet members 14', 15' may be substantially less with continuous switches 18' provided in pairs between the sheet members.

I claim:
1. In combination with an unmanned self-propelled vehicle and the like, the combination comprising:
   a pair of flexible sheet members,
   means supporting the sheet members from adjacent their ends on said vehicle with the surfaces of the sheet members extending generally vertically and in spaced relation to one another,
   and at least one continuous strip switch mounted on one of said sheet members adjacent the other of said sheet members such that when an obstacle is encountered by the outermost sheet member, it moves inwardly of the vehicle toward the inner sheet member and thereby compresses said continuous strip switch to produce a signal that can be used to energize a warning device or stop the vehicle.
2. The combination set forth in claim 1 wherein said continuous strip switch comprises a body of resilient material in which the contacts of the switch are embedded.
3. The combination set forth in claim 1 wherein a plurality of strip switches are provided in vertically spaced relation.
4. The combination set forth in claim 3 wherein said continuous strip switches are provided closely adjacent vertically spaced pairs.
5. The combination set forth in claim 1 wherein said means for supporting said sheet members comprises a bracket adjacent the ends of said sheet members and insulating means supporting said sheet members on said bracket in spaced electrically insulated relation,
   said continuous strip switch terminating in spaced relation to the ends of said flexible sheet members.
6. The combination set forth in claim 1 wherein said flexible sheet members extend along an arc of at least 180 degrees.

7. In an unmanned self-propelled vehicle and the like, the combination comprising:
a pair of flexible stainless steel sheet members,
means supporting the sheet members from adjacent their ends with the surfaces of the sheet members extending generally vertically and in spaced relation to one another,
and at least one continuous strip switch mounted on the inner of said sheet members adjacent the other of said sheet members, said continuous strip switch comprising a body of resilient material in which the contacts of the switch are embedded, such that when an obstacle is encountered by the outermost sheet member, it moves inwardly toward the inner sheet member and thereby causes compression of said continuous strip switch to produce a signal that can be used to energize a warning device or stop the vehicle.

8. The combination set forth in claim 7 wherein a plurality of strip switches are provided in vertically spaced relation.

9. The combination set forth in claim 8 wherein said continuous strip switches are provided in closely adjacent vertically spaced pairs.

10. The combination set forth in claim 7 wherein said means for supporting said sheet members comprises a bracket adjacent the ends of said sheet members and insulating means supporting said sheet members on said bracket in spaced electrically insulated relation,
said continous strip switch terminating in spaced relation to the ends of said flexible sheet members.

11. The combination set forth in claim 7 wherein said flexible sheet members are supported in an arc of at least 180 degrees.

References Cited

UNITED STATES PATENTS

| | | |
|---|---|---|
| 1,207,126 | 12/1916 | Benson. |
| 1,418,678 | 6/1922 | Schauman. |
| 1,701,800 | 2/1929 | Taylor. |
| 2,328,858 | 9/1943 | Sweetland. |
| 2,896,042 | 7/1959 | Koenig _____ 200—86 |
| 2,975,350 | 3/1961 | Mahoney _____ 200—86 |
| 3,351,724 | 11/1967 | Goble _____ 200—86 |

HERMAN O. JONES, Primary Examiner